W. S. EDELBLUTE.
GATE.
APPLICATION FILED JULY 21, 1919.
1,334,846.
Patented Mar. 23, 1920.
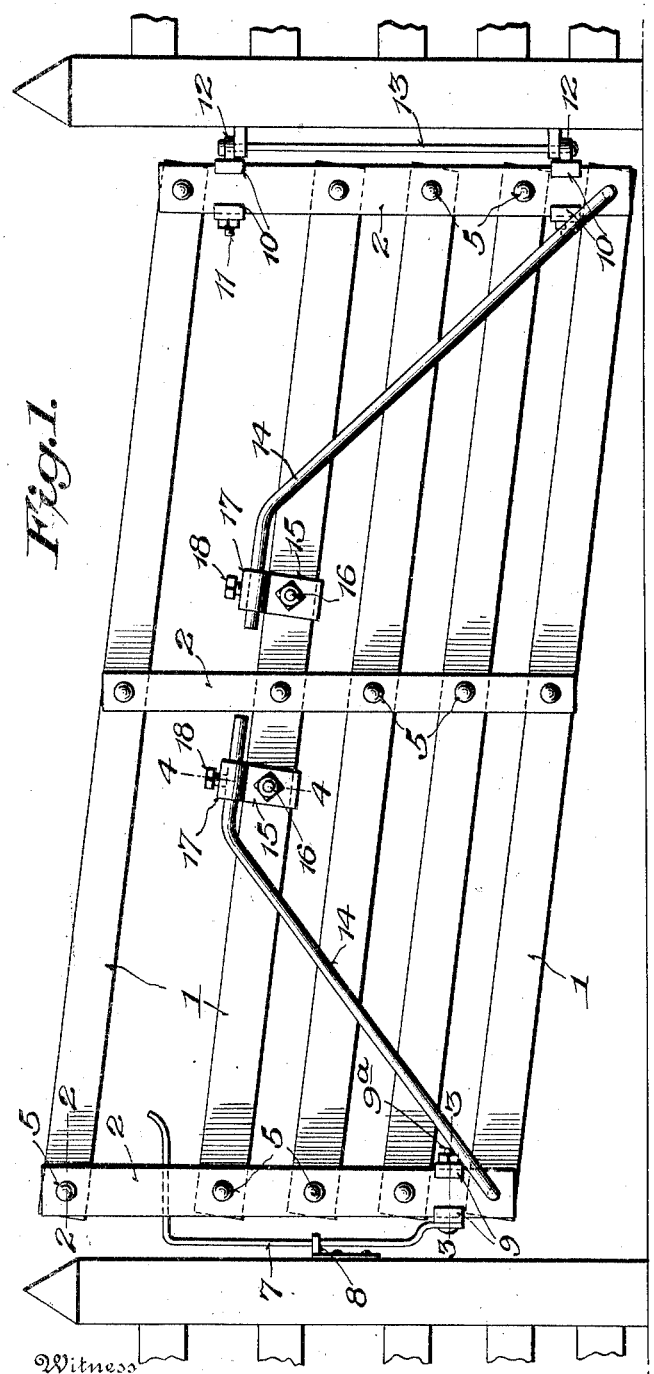
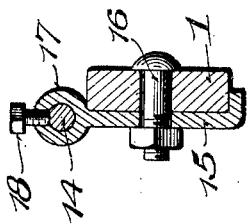
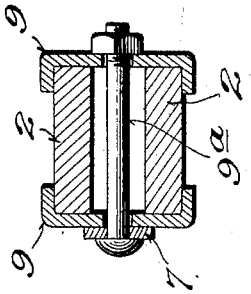
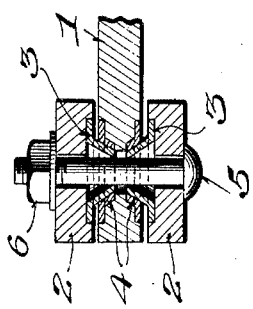
Inventor
W. S. Edelblute,

UNITED STATES PATENT OFFICE.

WILLIAM S. EDELBLUTE, OF DELPHOS, OHIO, ASSIGNOR OF ONE-HALF TO ISAAC McKENZIE, OF DELPHOS, OHIO.

GATE.

1,334,846.      Specification of Letters Patent.      Patented Mar. 23, 1920.

Application filed July 21, 1919. Serial No. 312,185.

*To all whom it may concern:*

Be it known that I, WILLIAM S. EDELBLUTE, a citizen of the United States, residing at Delphos, in the county of Allen and State of Ohio, have invented certain new and useful Improvements in Gates, of which the following is a specification.

This invention relates to a gate in which the horizontal members are pivotally secured between pairs of upright members thereby adapting the horizontal or longitudinal bars or members to be adjusted with respect to the ground and also relative to the upright members, such adjusting raising one end of the gate clear of the ground. The invention also includes novel and simple means for locking the gate in adjusted position and means for decreasing friction between the movable or adjustable parts, as well as preventing moisture and ice from interfering with said adjustment.

In the accompanying drawings:—

Figure 1 is a side elevation showing the gate adjusted to permit passage of small stock or animals, and acting as a bar to passage of larger animals.

Fig. 2 is a section on the line 2—2 of Fig. 1.

Fig. 3 is a section on the line 3—3 of Fig. 1.

Fig. 4 is a section on the line 4—4 of Fig. 1.

In the drawings 1 designates the longitudinal members or bars of the gate and 2 the upright members arranged in pairs, the members of each pair being spaced apart.

To the inner faces of the upright members 2 are secured convex washers 3, and concave washers 4 are set into the bars 1. Bolts 5 and nuts 6 pass through the uprights, bars and washers and serve as pivot pins for the bars 1.

The coöperating washers 3 and 4 serve as bearing for the bolts 5 and they not only reduce friction, by spacing the bars 1 from the uprights 2, but they also make it possible to operate the gate in wet and freezing weather. During wet weather the natural swelling of the wood would make it difficult to adjust the gate if a large portion of the wood surfaces were in direct contact, as the bars would bind against the uprights. Furthermore in the winter this moisture which would of course collect between the bars and the uprights would freeze and it would be practically impossible to operate the gate.

But with the washers or bearings shown both these difficulties are overcome, and the gate is rendered operable during wet and cold weather with almost as much ease as during warm and dry weather.

To the free end of the gate is secured a spring latch 7 which coöperates with a suitable keeper 8. The latch is secured by metal clamps 9 and a bolt 9$^a$. Similar clamps 10 through which pass eye-bolts 11, having eyes 12, are secured to the opposite end of the gate, and serve as hinges, a pivot rod 13 running through the eyes 12.

To lock the gate with bars 1 in adjusted position I employ angled rods 14, the lower ends of the rods being secured to the lower portions of the end uprights. The upper end portions of the rods are bent so as to lie parallel with one of the bars 1, preferably the one next the top of the gate. Metal plates 15 are secured to this bar, by bolts 16, and carry sleeves 17 and set screws 18. The upper portions of the rods 14 work in these sleeves and are locked in position by the set screws 18 thus making the gate rigid. I have employed the gate with but one of these rods, but find a firmer structure is had by employing two of them as shown.

What I claim is:—

A gate comprising parallel spaced upright members, bars carried thereby, concavo-convex washers carried respectively by said bars and uprights, bolts passing through said washers, an angled rod carried by the gate, one end of said rod being secured to the lower portion of one of said uprights, the opposite end extending parallel to one of the bars, a sleeve carried by the bar and receiving said parallel portion of the rod, and means carried by the sleeve for locking the rod thereto.

In testimony whereof I affix my signature.

WILLIAM S. EDELBLUTE.